(12) United States Patent
Jain et al.

(10) Patent No.: US 12,015,722 B2
(45) Date of Patent: Jun. 18, 2024

(54) METHODS AND SYSTEMS FOR CRYPTOGRAPHIC IDENTITY BASED NETWORK MICROSEGMENTATION

(71) Applicant: Pensando Systems Inc., Milpitas, CA (US)

(72) Inventors: Vipin Jain, San Jose, CA (US); Ravi Kumar Gadde, Los Altos, CA (US); Enrico Schiattarella, Los Altos, CA (US); Sukhesh Halemane, San Jose, CA (US)

(73) Assignee: Pensando Systems, Inc., Milpitas, CA (US)

( * ) Notice: Subject to any disclaimer, the term of this patent is extended or adjusted under 35 U.S.C. 154(b) by 469 days.

(21) Appl. No.: 16/958,611

(22) PCT Filed: Dec. 20, 2018

(86) PCT No.: PCT/US2018/066801
§ 371 (c)(1),
(2) Date: Jun. 26, 2020

(87) PCT Pub. No.: WO2019/133434
PCT Pub. Date: Jul. 4, 2019

(65) Prior Publication Data
US 2020/0336316 A1  Oct. 22, 2020

Related U.S. Application Data

(60) Provisional application No. 62/612,093, filed on Dec. 29, 2017.

(51) Int. Cl.
*H04L 9/32* (2006.01)
*G06F 9/455* (2018.01)
(Continued)

(52) U.S. Cl.
CPC ........ *H04L 9/3268* (2013.01); *G06F 9/45558* (2013.01); *H04L 9/0894* (2013.01); *H04L 63/205* (2013.01); *G06F 2009/45595* (2013.01)

(58) Field of Classification Search
CPC ... H04L 9/3268; H04L 9/0894; H04L 63/205; G06F 9/45558
(Continued)

(56) References Cited

U.S. PATENT DOCUMENTS 6,212,634 B1    4/2001   Geer, Jr. et al.
7,640,429 B2   12/2009   Huang et al.
(Continued)

FOREIGN PATENT DOCUMENTS

WO    WO-2019133434 A1    7/2019
WO    WO-2020092225 A1    5/2020
WO    WO-2021146463 A1    7/2021

OTHER PUBLICATIONS

Co-pending U.S. Appl. No. 16/742,631, filed Jan. 14, 2020.
(Continued)

*Primary Examiner* — Kambiz Zand
*Assistant Examiner* — Phuc Pham
(74) *Attorney, Agent, or Firm* — Patterson + Sheridan, LLP

(57) ABSTRACT

Methods and network interface devices for establishing a secure and authenticated network connection are provided. The method comprises: receiving, from a requesting entity, a destination IP address and a first certificate that is used to establish a secure network connection, wherein the first certificate comprises a first security attribute that is associated with a source destination IP address; identifying, with aid of one or more processors, a stored second security attribute associated with the destination IP address; and determining, with aid of the one or more processors, a policy (Continued)

action based at least in part on the first security attribute and the second security attribute.

33 Claims, 9 Drawing Sheets

(51) Int. Cl.
*H04L 9/08* (2006.01)
*H04L 9/40* (2022.01)
*H04L 29/06* (2006.01)

(58) Field of Classification Search
USPC .......................................................... 713/156
See application file for complete search history.

(56) References Cited

U.S. PATENT DOCUMENTS

| | | | |
|---|---|---|---|
| 8,069,293 B1 | 11/2011 | Rogan et al. | |
| 8,407,464 B2 | 3/2013 | Salowey et al. | |
| 8,413,238 B1 | 4/2013 | Sutton | |
| 9,143,504 B1 | 9/2015 | Shi et al. | |
| 9,479,338 B2 | 10/2016 | Sabin | |
| 9,648,137 B1 | 5/2017 | Haynie et al. | |
| 9,830,143 B2 | 11/2017 | Chigurapati et al. | |
| 10,908,895 B2 | 2/2021 | Halder et al. | |
| 2002/0065828 A1 | 5/2002 | Goodspeed | |
| 2002/0144108 A1* | 10/2002 | Benantar | H04L 9/3263 713/156 |
| 2007/0261112 A1 | 11/2007 | Todd et al. | |
| 2009/0198689 A1* | 8/2009 | Frazier | G06F 16/13 |
| 2010/0131646 A1 | 5/2010 | Drako | |
| 2010/0306816 A1* | 12/2010 | McGrew | H04L 63/08 726/1 |
| 2012/0072894 A1 | 3/2012 | Wang et al. | |
| 2013/0212292 A1* | 8/2013 | Jennings | H04N 7/17318 709/231 |
| 2014/0258999 A1 | 9/2014 | Katihar et al. | |
| 2014/0304802 A1 | 10/2014 | Pope et al. | |
| 2015/0269383 A1 | 9/2015 | Lang et al. | |
| 2015/0326401 A1* | 11/2015 | Jin | H04L 63/123 713/158 |
| 2016/0036778 A1* | 2/2016 | Chen | H04W 12/37 726/1 |
| 2016/0048936 A1* | 2/2016 | Perkowski | G06Q 10/063 705/310 |
| 2016/0188313 A1 | 6/2016 | Dubal et al. | |
| 2016/0330230 A1 | 11/2016 | Reddy et al. | |
| 2016/0364231 A1 | 12/2016 | Tati et al. | |
| 2017/0006022 A1 | 1/2017 | Gunti et al. | |
| 2018/0074837 A1 | 3/2018 | Zhang et al. | |
| 2020/0136836 A1 | 4/2020 | Schiattarella et al. | |
| 2020/0356358 A1 | 11/2020 | Giri et al. | |

OTHER PUBLICATIONS

PCT/US2018/066801 International Search Report and Written Opinion dated Apr. 2, 2019.
PCT/US2019/058324 Invitation to Pay Additional Fees dated Dec. 27, 2019.
PCT/US2019/058324 International Search Report and Written Opinion dated Feb. 25, 2020.
U.S. Appl. No. 16/173,441 Office Action dated Jun. 23, 2020.
Mavridis et al.: Access control based on attribute certificates for medical intranet applications. J Med Internet Res. 3(1):E9, pp. 1-9. doi:10.2196/jmir.3.1.e9 (2001).
Su: User Behaviour Based Access Control Decision. IEEE Xplore 2010 International Conference on E-Business and E-Government, pp. 1372-1376 doi:10.1109/ICEE.2010.349 (2010).
PCT/US2021/013489 International Search Report and Written Opinion dated Apr. 22, 2021.
Office Action from European Patent Application No. 18894582.8 dated May 8, 2023.

* cited by examiner

METHODS AND SYSTEMS FOR CRYPTOGRAPHIC IDENTITY BASED NETWORK MICROSEGMENTATION

CROSS-REFERENCE TO RELATED APPLICATIONS

This application is the National Stage Entry of International Application No. PCT/US2018/066801, filed on Dec. 20, 2018, which claims the priority and benefit of U.S. Provisional Application No. 62/612,093 filed on Dec. 29, 2017, entitled, "METHODS AND SYSTEMS FOR CRYPTOGRAPHIC IDENTITY BASED NETWORK MICROSEGMENTATION," the entire contents of each are incorporated herein by reference for all purposes.

BACKGROUND

Microsegmentaion has been used to enhance security and efficiency of a network. For example, network traffic of a cluster which is trusted, may be segregated from network traffic of another cluster which is untrusted. A cluster may be a physical system such as an organization, department, a node and the like. A cluster may be any virtual network segment. A network device of the cluster can be configured to route network traffic separately for each network segment.

SUMMARY

Traditionally, network is segmented based on IP address. IP-based microsegmentation may enable forwarding and security policies for network traffic between clusters or sites based on IP addresses. However, this approach requires exchanging IP endpoint information across clusters and sites in a changing environment. For example, data center topologies may be constantly changing: networks are re-numbered, server pools are expanded, or workloads are moved. In this case, the security policy configured when a workload was first deployed may not be enforceable if the definition of the security policy is associated with the IP address, port, or protocol. The difficult challenge is exacerbated when the workloads move from one cluster (e.g., data center) to another.

In light of the above, it would be desirable to provide a method and system for network micro segmentation with improved scalability and flexibility. The present invention addresses this need and provides related advantages as well.

Accordingly, in one aspect, a method for establishing a secure and authenticated network connection is provided. The method may comprise: (a) receiving, from a requesting entity, a destination IP address and a first certificate that is used to establish a secure network connection, wherein the first certificate comprises a first security attribute that is associated with a source destination IP address; (b) identifying, with aid of one or more processors, a stored second security attribute associated with the destination IP address; and (c) determining, with aid of the one or more processors, a policy action based at least in part on the first security attribute and the second security attribute.

In some embodiments, the method further comprises transmitting, from the requesting entity, a certificate signing request (CSR) to an intermediate certificate authority, wherein the CSR comprising a security attribute and an associated IP address. In some cases, a mapping relationship between the security attribute and the IP address is received from a computing device running the intermediate certificate authority. In some cases, the mapping relationship is at least in part managed by the intermediate certificate authority. In some cases, the method further comprises receiving a certificate from the intermediate certificate authority, wherein the certificate comprises the security attribute. In some cases, the method further comprises storing the certificate in a local database managed by the requesting entity. In some cases, the intermediate certificate authority is verified by a root certificate authority.

In some embodiments, the method further comprises identifying, with aid of the one or more processors, a second stored certificate associated with the destination IP address. In some cases, the method further comprises transmitting the second stored certificate to the requesting entity. In some cases, the first certificate and the second certificate are issued by the same intermediate certificate authority. Alternatively, the first certificate and the second certificate are issued by different intermediate certificate authorities. In some instances, the different intermediate certificate authorities are verified by the same root certificate authority. In some cases, the second security attribute comprises a security group the destination IP address is associated therewith.

In some embodiments, the method further comprises executing the determined policy action on a base system logic or by the requesting entity. In some cases, the base system logic comprises a bare metal server, a hypervisor or a docker base for controlling one or more virtual machines or containers. In some embodiments, the policy action comprises at least one of the following: allow, block, rate-limit, mark or alert. In some embodiments, the first security attribute comprises a security group the source IP address is associated therewith.

In a related yet separate aspect, a network interface device is provided. The device may comprise: (i) a memory for storing a set of instructions, and (ii) one or more processors configured to execute the set of instructions to: (a) receive, from a requesting entity, a destination IP address and a first certificate that is used to establish a secure network connection, wherein the first certificate comprises a first security attribute that is associated with a source IP address; (b) identify a stored second security attribute associated with the destination IP address; and (c) determine a policy action based at least in part on the first security attribute and the second security attribute.

In some embodiments, the one or more processors are further configured to generate and transmit a certificate signing request (CSR) to an intermediate certificate authority, wherein the CSR comprising a security attribute and an associated IP address. In some cases, a mapping relationship between the security attribute and the IP address is received from a computing device running the intermediate certificate authority. In some cases, the mapping relationship is at least in part managed by the intermediate certificate authority. In some cases, the one or more processors are further configured to receive a signed certificate from the intermediate certificate authority, and wherein the signed certificate comprises the security attribute. For example, the one or more processors are further configured to store the signed certificate in a local database managed by the network interface device. In some cases, the intermediate certificate authority is verified by a root certificate authority.

In some embodiments, the one or more processors are further configured to identity a second stored certificate associated with the destination IP address. In some cases, the one or more processors are further configured to transmit the second stored certificate to the requesting entity. In some cases, the first certificate and the second certificate are issued by the same intermediate certificate authority. Alternatively, the first certificate and the second certificate are issued by different intermediate certificate authorities. In some cases, the different intermediate certificate authorities are verified by the same root certificate authority.

In some embodiments, the determined policy action is executed on a base system logic. In some cases, the base system logic comprises a bare metal server, a hypervisor or a docker base for controlling one or more virtual machines or containers and wherein the bare metal server, the hypervisor or the docker base is coupled to the network interface device. In some cases, the policy action is selected from the group comprising: allow, block, rate-limit, mark or alert.

In some embodiments, the first security attribute comprises a security group the source IP address is associated therewith. In some embodiments, the second security attribute comprises a security group the destination IP address is associated therewith.

It shall be understood that different aspects of the invention can be appreciated individually, collectively, or in combination with each other. Various aspects of the invention described herein may be applied to any of the particular applications set forth below or for any other types of the network traffic management/security system disclosed herein. Any description herein concerning the network microsegmentation may apply to and be used for any other network microsegmentation situations. Additionally, any embodiments disclosed in the context of the network microsegmentation system are also applicable to the methods disclosed herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
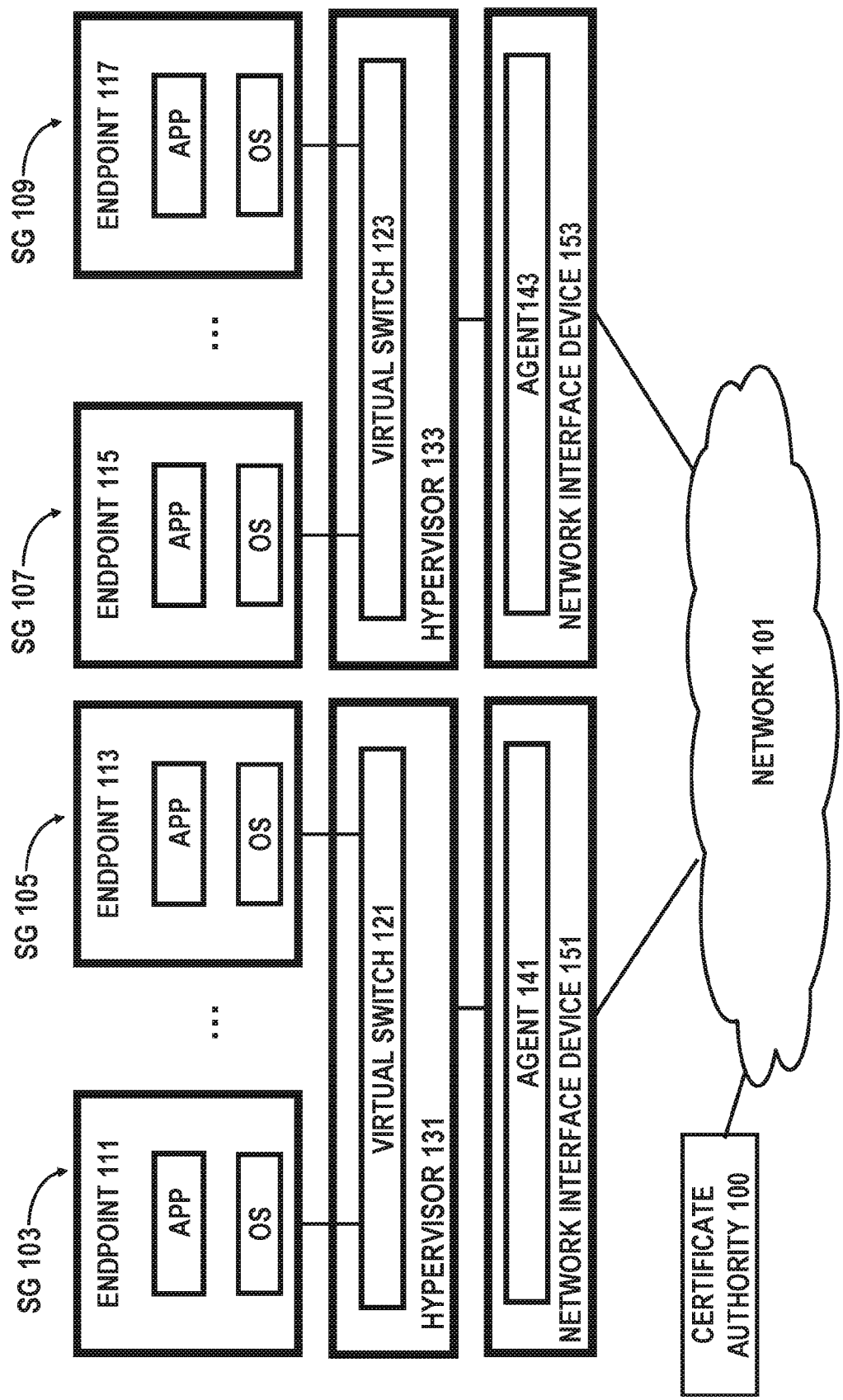
FIG. 1A is an exemplary block diagram illustrating connections between microsegments over a network, in accordance with embodiments of the invention.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Certain Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments of the invention may be used in a variety of applications. Some embodiments of the invention may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a virtual local area network (VLAN), a wireless LAN (WLAN), a metropolitan area network (MAN), a wireless MAN (WMAN), a wide area network (WAN), a wireless WAN (WWAN), a personal area network (PAN), a wireless PAN (WPAN), a virtual private network (VPN), a storage area network (SAN), a frame relay connection, an Advanced Intelligent Network (AIN) connection, a synchronous optical network (SONET) connection, devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

It is noted that various embodiments can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like. Embodiments of the invention may be used in various other devices, systems, and/or networks.

While portions of this disclosure, for demonstrative purposes, refer to wired and/or wired communication systems or methods, embodiments of the invention are not limited in this regard. As an example, one or more wired communication systems, can utilize one or more wireless communication components, one or more wireless communication methods or protocols, or the like.

Although some portions of the discussion herein may relate, for demonstrative purposes, to a fast or high-speed interconnect infrastructure, to a fast or high-speed interconnect component or adapter with OS bypass capabilities, to a fast or high-speed interconnect card or Network Interface Card (NIC) with OS bypass capabilities, or to a to a fast or high-speed interconnect infrastructure or fabric, embodiments of the invention are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the invention may be utilized in conjunction with InfiniBand (IB) infrastructures, fabrics, components, adapters, host channel adapters, cards or NICs; with Ethernet infrastructures, fabrics, components, adapters, host channel adapters, cards or NICs; with gigabit Ethernet (GEth) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs; with infrastructures, fabrics, components, adapters, host channel adapters, cards or NICs that are connectionless and/or stateless; and/or other suitable hardware.

In one aspect, methods and systems of the present disclosure are provided for establishing a secure and/or authenticated network connection. The secured network connection may be provided by means of cryptography based microsegmentation. In some embodiments, a certificate is used for establishing a secure network connection. The certificate may be generated and issued to each workload. In some embodiments, the certificate may comprise information related to policy and/or security attributes of ends of connection for establishing the connection. The described system and method may utilize a cryptographic identity of ends of a connection that is consistent across clusters, thereby providing improved scalability and flexibility of network microsegmentation.

Cryptography

In some embodiments, the system and method may utilize cryptographic technologies such as Transport Layer Security (TLS) and its predecessor, Secure Sockets Layer (SSL). TLS and SSL are cryptographic protocols or encryption protocols used to provide secure connections over the Internet. SSL utilizes X.509 certificates, certificate authorities, and a public key infrastructure to verify relation between a certificate and its owner, as well as to generate, sign, and administer the validity of certificates. According to SSL protocols, session information between endpoints of a connection such as an SSL client and an SSL server are negotiated through a handshake phase and the identity of the SSL server is verified by the SSL client. In the server-client example, the session information may include a session ID, peer certificates, the cipher specification to be used, the compression algorithm to be used, and shared secrets that are used to generate symmetric cryptographic keys. The SSL client may encrypt a premaster secret with a public key from the SSL server's certificate and transmits the premaster secret to the server. Then, both parties compute the master secret locally and derive the session key from it. After the handshake phase, a secure socket may be established, and application data encrypted by the session key can be securely transmitted between the client and server.

Certificates may be used to create secure connections between endpoints of a network. For example, trusted certificates can be used to create secure connections to a server via the Internet. A certificate is essential in order to circumvent a malicious party which happens to be on the route to a target server which acts as if it were the target. Such a scenario is commonly referred to as a man-in-the-middle attack. The client uses the certificate authority (CA) certificate to authenticate the CA signature on the server certificate, as part of the authorizations before launching a secure connection. A certificate authority or certification authority (CA) is an entity that issues digital certificates. A digital certificate may certify the ownership of a public key by the named subject of the certificate. This allows others (relying parties) to rely upon signatures or on assertions made about the private key that corresponds to the certified public key. A CA acts as a trusted third party—trusted both by the subject (owner) of the certificate and by the party relying upon the certificate.

Microsegmentation

In some cases, a microsegment may correspond to a virtual network. In some cases, a microsegment may correspond to an endpoint group. In some instances, the endpoint group may refer to a security group and the definition of a security group can be defined by a network administer such that the definition can be changed or modified. In some cases, a microsegment may correspond to a cluster (e.g., data center, subnet, node device) that may be a physical system or a virtual network segment. The microsegment may be dynamic or ever changing. Because the certificate is tied to a workload rather than the IP address, the provided method and system may be well adapted to the dynamic environment. In some embodiments, endpoint can be referred to as workload. In this case, a certificate may be issued to an endpoint for establishing a secure connection with other endpoints.

In some cases, endpoint groups can be used in network environment for mapping applications to the network. In particular, endpoint groups can use a grouping of application endpoints in the network to apply connectivity and policy to the group of applications. Endpoint groups can act as a container for buckets or collections of applications, or application components, and tiers for implementing forwarding and policy logic. Endpoint groups may also allow separation of network policy, security, and forwarding from addressing by instead using logical application boundaries. For example, each endpoint group may connect to network fabric via leaf switches. In some embodiments, endpoints belong to the same endpoint group may be considered as sharing security attributes. In some embodiments, an endpoint group that an endpoint belongs to may be a security attribute of the endpoint. Details regarding endpoint are described later herein.

FIG. 1A is an exemplary block diagram illustrating connections between microsegments over a network 101, in accordance with embodiments of the invention. As mentioned above, a microsegment may correspond to an endpoint group such as security group SG 103, SG 105, SG 107, SG 109. A security group may comprise one or more endpoints. An endpoint may belong to a security group. In the illustrated example, each endpoint belongs to a respective security group. However, any number of endpoints that may or may not be associated with the same node can be assigned to the same security group. Endpoints can be grouped regardless of the physical system or infrastructure that the endpoints are attached to.

Network 101 may be a telecommunications network that allows computers to exchange data. For example, in network 101, networked computing devices pass data to each other along data connections (e.g., network links). Data can be transferred in the form of packets. The connections between nodes may be established using either cable media or wireless media. The network 101 may, for example, include a wireless network, a local area network (LAN), a virtual local area network (VLAN), a wireless LAN (WLAN), a metropolitan area network (MAN), a wireless MAN (WMAN), a wide area network (WAN), a wireless WAN (WWAN), a personal area network (PAN), a wireless PAN (WPAN), a virtual private network (VPN), a storage area network (SAN), a frame relay connection, an Advanced Intelligent Network (AIN) connection, a synchronous optical network (SONET) connection, devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards. The network can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like.

In an example, the network 101 may be Internet that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network.

An endpoint can be any network entity, component or communication device. For instance, an endpoint can be a physical server, process (e.g., function running on a virtual machine), external network, a virtual partition, legacy mainframes, modem, hub, bridge, switch, router, server, workstation, desktop computer, laptop computer, tablet, mobile phone, desk phone, wearable device, or other network or electronic device. A virtual partition may be an instance of a virtual machine (VM), sandbox, container, or any other isolated environment that can have software operating within it. In some example embodiments, endpoints can include a server, hypervisor, process, or switch configured with virtual tunnel endpoint (VTEP) functionality which connects an overlay network with network fabric. The overlay network may allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), can provide a traffic encapsulation scheme which allows network traffic to be carried across L2 and L3 networks over a logical tunnel. Such logical tunnels can be originated and terminated through VTEPs. The overlay network can host physical devices, such as servers, applications, endpoint groups, virtual segments, virtual workloads, etc. In addition, endpoints can host virtual workload(s), clusters, and applications or services, which can connect with network fabric or any other device or network, including an internal or external network. For example, endpoints can host, or connect to, a cluster of load balancers or an endpoint group of various applications.

Endpoints belong to the same endpoint group or security group may or may not be of the same type. In the illustrated example of FIG. 1A, the endpoints are shown as virtual machines (VMs). However, endpoints of different types such as VM and container can be assigned to the same endpoint group. In some cases, endpoints may be grouped according to a virtual network segment. For instance, VMs connected to the same physical hosts may be grouped together as a security group or endpoint group. In other examples, VMs connected to different physical hosts may be grouped together. Endpoints may be grouped based on IP address or subnet they belong to. Alternatively, endpoints may be grouped regardless of their IP addresses. In some embodiments, endpoints may be grouped by user defined rules. For example, user may define a security group or endpoint group based on one or more attributes of endpoints that may or may not relate to IP address. For instance, the attributes can be a VM-name, operating system (OS)-name, host-name or a fully qualified domain name (FQDN).

FIG. 1A depicts an exemplary virtual environment. The one or more endpoints may be virtual machines. The described system or method may be used to provide secure network connection between endpoints using the cryptographic identity of the endpoint. In some embodiments, the cryptographic identity of an endpoint may comprise the security attribute of the endpoint such as the security group the endpoint belongs to. It should be noted that a security group can be defined regardless of the physical system or IP addresses. For instance, a security group may correspond to multiple nodes, a subset of endpoints connected to a node, multiple endpoints connected to multiple nodes, a single node or a single endpoint.

The depicted virtual environment may comprise one or more physical hosts hosting one or more endpoints. A physical host may be a computing device that acts as computing server such as a blade server or bare-metal server. In some cases, a physical host may be part of a cloud computing environment. By way of further non-limiting examples, a physical host can host different combinations and permutations of virtual and container environments.

In the illustrated example, a virtual environment of the node may comprise hardware, host operating system (not shown), hypervisor 131, 133, and virtual machines 111, 113, 115, 117. The host operating system can run on hardware and can also be referred to as the host kernel. In some embodiments, hypervisor 131, 133 may comprise a virtual switch 121. The virtual machine (i.e., endpoint 111, 113, 115, 117) may each include a respective one of operating systems (OS) and applications (APP). In the illustrated example, a node may comprise a network interface device 151, 153 configured to enable communication with another system or device over the network 101.

In some cases, an agent 141, 143 may run on the network interface device. The agent may be configured to operate in conjunction with a certificate authority 100 to facilitate a secure network connection. The agent may be configured for managing security of an endpoint. For example, the agent at a sender's side or source side may send a request to the certificate authority (CA) for signing a certificate of a secure connection associated with the source and a security attribute. In some cases, the agent may verify if the certificate is a valid certificate based on the digital signature included in the certificate. The agent may then store and manage the signed certificate associated with the endpoint in a local database. For example, a certificate issued by a certificate authority may have a validity period based on the certificate management protocol. If a new certificate is generated or the certificate is renewed and pushed to the agent, the agent may delete the old certificate from the client machine and install the new certificate to the trusted certificate store of the client machine.

In some embodiments, the agent may initiate a connection to a destination endpoint using the stored certificate. In some cases, the agent at the receiver's side or destination side may check a policy to allow or deny the connection based on the security attribute of the source and a security attribute of the destination. In some cases, the agent may also be configured for managing the security of traffic pass through the network. For instance, the agent may execute an action according to the policy determined based on the source and destination security attribute to, for example, permit or allow the flow described in the policy (i.e., forward the communication), block or deny the flow described in the policy (i.e., drop the communication), limit the bandwidth consumed by the flow (i.e., rate-limit), log the flow, "mark" the flow for quality of service (QoS) (e.g., set a lower or higher priority for the flow), redirect the flow (e.g., to avoid critical paths), copy the flow, and various other actions. Alternatively, such operations may be performed by other modules of the endpoint or the node.

The agent may be local to the node of the network or the endpoint. In the illustrated example, the agent is running on the network interface device 151 such as NIC. Alternatively or additionally, the agent may reside on any component of the node such as virtual partition, hypervisor, physical server, switch, router, gateway, or other independent systems or devices operably or communicatively coupled to the node. As mentioned elsewhere herein, the virtual partition may be an instance of a virtual machine (VM), sandbox, container, virtual switch, or any other isolated environment that can have software operating within it. The agent may be implemented by software, hardware or a combination of both.

Hypervisor (also known as a virtual machine monitor (VMM)) 131, 133, is software running on at least one of physical hosts, and the hypervisor 131, 133, runs VMs. A physical host on which hypervisor is running one or more virtual machines 111, 113 is also referred to as a host machine. Each VM 111, 113 can also be referred to as a gust machine. For example, hypervisor 131 may allow multiple operating systems to share a single physical host.

Hypervisor may also include a virtual switch 121, 123. A virtual switch is a logical switching fabric for networking VMs. For example, virtual switch 121 may be a program running on a physical host that allows VM 111, 113 to communicate with another VM.

The certificate authority 100 may be implemented by any suitable systems such as a server. The certificate authority 100 as described elsewhere herein may issue certificate in response to a request submitted by the agent. In some cases, the certificate authority 100 may be verified by another certificate authority (e.g., root certificate authority).

Figure 1B:
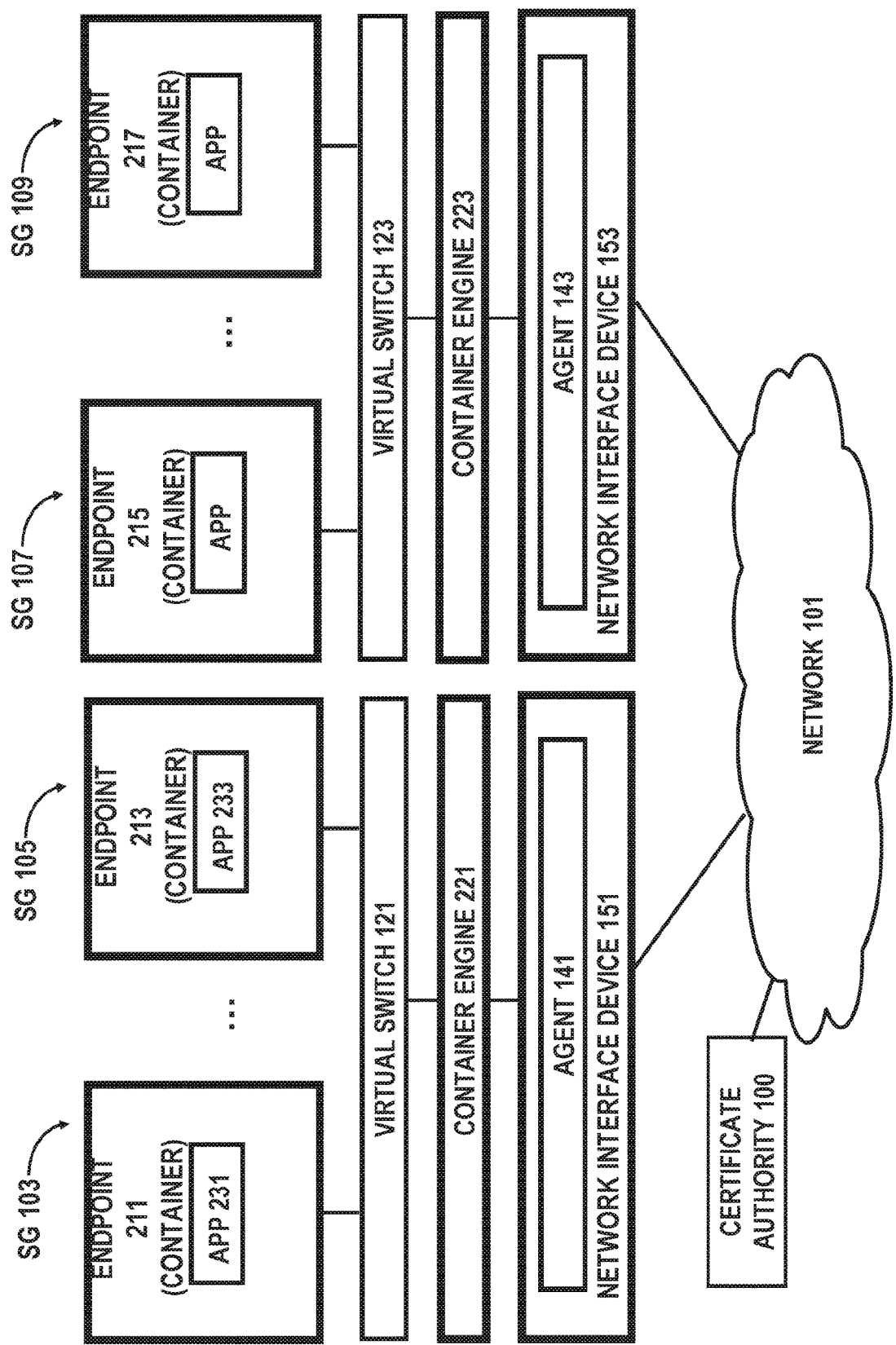
FIG. 1B depicts an exemplary network environment.

FIG. 1B depicts another exemplary network environment. The network environment may comprise hardware, host operating system, container engine 221, 223, containers (e.g., endpoint 211, 213, 215, 217), virtual switch 121, 123 and agent 141, 143.

Host operating system may allow for multiple (instead of just one) isolated user-space instances (e.g., containers 211, 213, 215, 217) to run in host operating system (e.g., a single operating system instance). In some cases, a host operating system may include a container engine.

Container engine 221, 223 may be configured to create and manage containers 211, 213, 215, 217, for example, using an (high-level) application programming interface (API). By way of non-limiting example, container engine 221, 223 may be at least one of Docker®, Rocket (rkt), Solaris Containers, and the like. For example, container engine 221 may create a container (e.g., one of containers 211, 213) using an image. An image can be a (read-only) template comprising multiple layers and can be built from a base image (e.g., for host operating system) using instructions (e.g., run a command, add a file or directory, create an environment variable, indicate what process (e.g., application or service) to run, etc.). Each image may be identified or referred to by an image type. In some embodiments, images (e.g., different image types) are stored and delivered by a system (e.g., server side application) referred to as a registry or hub.

Container engine 221, 223 may allocate a filesystem of host operating system to the container and add a read-write layer to the image. Container engine can create a network interface that allows the container to communicate with hardware (e.g., talk to a local host). Container engine can set up an Internet Protocol (IP) address for the container (e.g., find and attach an available IP address from a pool). Container engine can launch a process (e.g., application or service) specified by the image (e.g., run an application, such as one of APPs 231, 233, described further below). Container engine can capture and provide application output for the container (e.g., connect and log standard input, outputs and errors). The above examples are only for illustrative purposes and are not intended to be limiting.

Containers 211, 213, 215, 217 can be created by container engine 221, 223. In some embodiments, containers are each an environment as close as possible to an installation of host operating system, but without the need for a separate kernel. For example, containers 211, 213, may share the same operating system kernel with each other and with host operating system 320. Each container of containers 211, 213 can run as an isolated process in user space on host operating system. Shared parts of host operating system can be read only, while each container of containers 211, 213 can have its own mount for writing.

Containers 211, 213, 215, 217 can include one or more applications (APPs) 231, 233 (and all of their respective dependencies). APPs 231, 233 can be any application or service. By way of non-limiting example, APPs can be a database (e.g., Microsoft® SQL Server®, MongoDB, HTFS, etc.), email server (e.g., Sendmail®, Postfix, qmail, Microsoft® Exchange Server, etc.), message queue (e.g., Apache® Qpid™, RabbitMQ®, etc.), web server (e.g., Apache® HTTP Server™, Microsoft® Internet Information Services (IIS), Nginx, etc.), Session Initiation Protocol (SIP) server (e.g., Kamailio® SIP Server, Avaya® Aura® Application Server 5300, etc.), other media server (e.g., video and/or audio streaming, live broadcast, etc.), file server (e.g., Linux server, Microsoft® Windows Server®, etc.), service-oriented architecture (SOA) and/or microservices process, object-based storage (e.g., Lustre®, EMC® Centera®, Scality® RING®, etc.), directory service (e.g., Microsoft® Active Directory®, Domain Name System (DNS) hosting service, etc.), and the like. The APPs can also be any endpoint protection software that may perform security action determined based on cryptographic identity of the endpoints.

Virtual switch 121, 123 may be a logical switching fabric for networking containers. For example, virtual switch 121 may allow a container (of containers 211, 213) to communicate with another container. For example, containers 211, 213 can communicate with other devices such as VMs and bare-metal. In some embodiments, virtual switch 121, 123 may execute as a part of host operating system.

Figure 2:
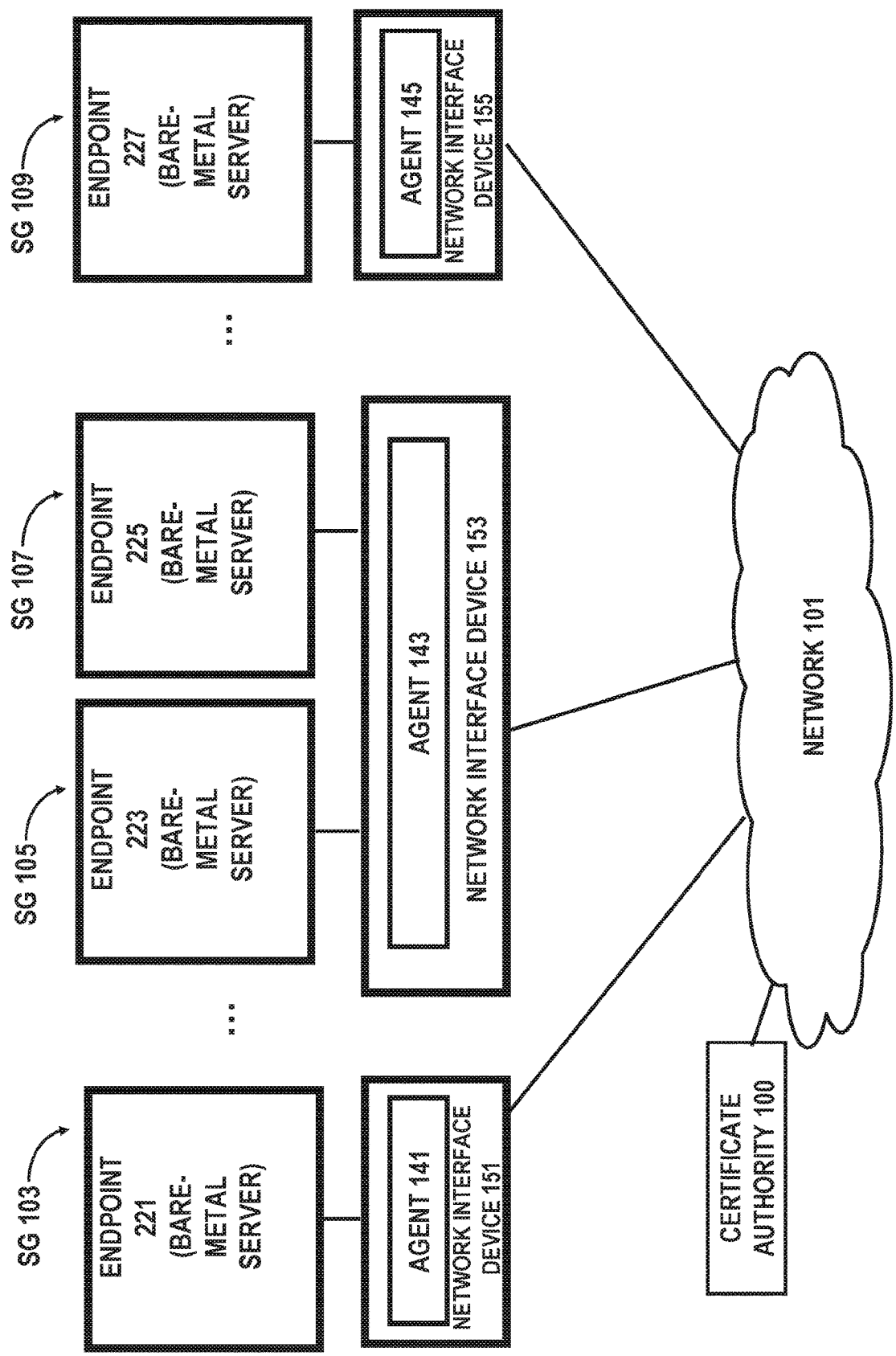
FIG. 2 depicts an exemplary network environment.

FIG. 2 depicts another exemplary network environment. The network environment may comprise computing servers (e.g., endpoint 221, 223, 225, 227), network interface devices 151, 153, 155 and agent 141, 143.

The computing servers may be physical hosts communicate with other devices or systems via the network interface device 151, 153, 155. The computing servers may be, for example, blade servers or bare-metal servers. In some cases, the physical hosts may host different combinations and permutations of virtual and container environments as described above.

Figure 3:
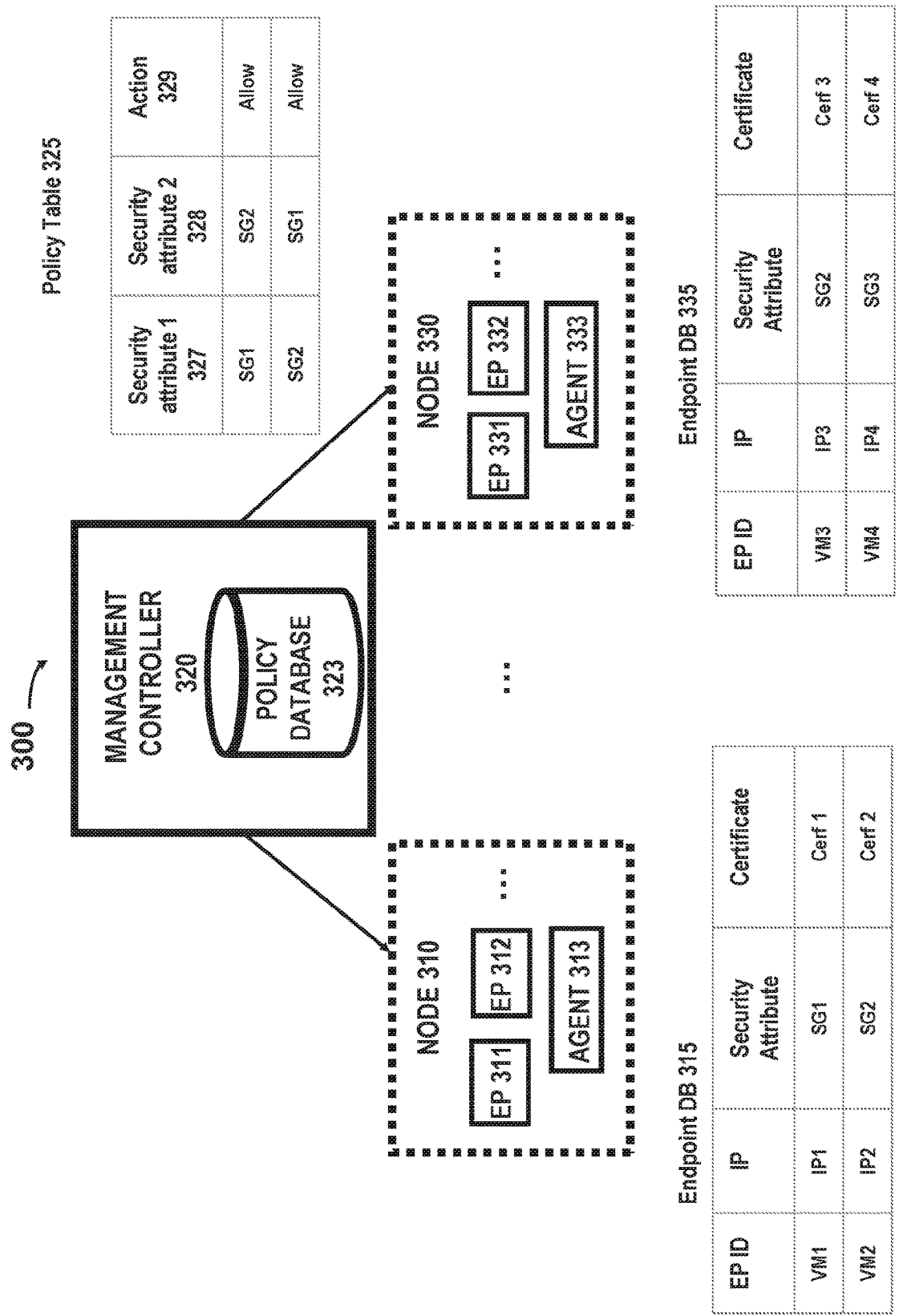
FIG. 3 shows an exemplary cryptography based microsegmentation system for managing network flow.

FIG. 3 shows an exemplary cryptography based micro-segmentation system for managing network flow. A network flow is conventionally characterized as one or more packets sharing certain attributes that are sent within a network within a specified period of time. Packet attributes can include a network source address (e.g., Internet Protocol (IP) address, Media Access Control (MAC) address, Domain Name System (DNS) name, or other network address), source port, destination address, destination port, protocol type, class of service, among other characteristics. The network source address may correspond to a first endpoint (e.g., modem, hub, bridge, switch, router, server, workstation, desktop computer, laptop computer, tablet, mobile phone, desk phone, wearable device, or other network or electronic device) of the network, and the network destination address may correspond to a second endpoint of the network. In some cases, a switch or router interface can also be a packet attribute used to distinguish network flows.

In some embodiments, the system 300 may comprise a management controller 320 and one or more agents 313, 333. The management controller and the agent may be implemented by hardware, software or a combination of both. The management controller may work in conjunction with the one or more agents to provide secure and/or authenticated connection between endpoints of a network. The system may comprise any number of management controllers or agents.

In some embodiments, the management controller 320 may operate as a certificate authority. In some cases, the certificate authority can be the same as the certificate authority as described in FIG. 1A or elsewhere herein. In some cases the certificate authority may be an intermediate CA. The intermediate CA may be verified by a trusted root certificate authority. In this case, the system may comprise multiple intermediate CAs that may or may not be verified by the same trusted root certificate authority.

In some embodiments, the management controller may comprise or coupled to a policy database 323. The policy database 323 may server as a repository for network policy or security policy. The policy database can utilize various database structures such as a normalized relational database or NoSQL database.

Network policies can determine whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. A rule, for example, allows or denies a connection to a specific group, allows connection between groups or denies a connection between groups, redirects a connection from one IP address to another IP address, logs communications to and/or from a specific IP address, allows or denies a connection for rate-limit purpose, marks a suspicious flow, generates alert and various others. As described elsewhere herein, an IP address may be virtual, physical, or both.

Network policy can be stored in any suitable data structure. In the depicted example, the network policy may be stored in a table 325. For instance, a connection may be allowed or denied based on a network policy or rule set stored in the table 325. A policy may specify security attributes 327, 328 such as source security group, destination security group, and action 329 to be applied to a packet when the packet matches security attributes. In an example, once a source security group (e.g., SG1) and a destination security group (e.g., SG2) are identified, the action (e.g., Allow) can be determined.

Action 329 can be the action that is applied to a communication when the communication matches a corresponding policy. For example, action 329 can be to permit or allow a flow (i.e., forward the communication), block or deny a flow (i.e., drop the communication), limit the bandwidth consumed by the flow, log the flow, "mark" the flow for quality of service (QoS) (e.g., set a lower or higher priority for the flow), redirect the flow (e.g., to avoid critical paths), copy the flow, etc. In some example embodiments, action 329 can have an expiration time or date. For example, it can only take the designated action (e.g., allow, block, mark, etc.) for a certain amount of time before the communication is dropped. Similarly, action can have designated times of applicability, for example only during peak hours. A policy can be over-inclusive or under-inclusive. For example, in certain situations, a whitelist policy may allow communications that are potentially harmful to the network while a blacklist policy can block communications that are permitted by the network.

Policies can be established external to a network system. In some cases, a network administrator can manually change the policies. Policies can dynamically change and be conditional on events. In some cases, the policy table may be pushed to some or all of the nodes of a network that is managed by the management controller.

The management controller 320 may be in communication with one or more nodes 310, 330 over the network. The node 310, 330 can be the same as the node as described in connection with FIG. 1A. In some embodiments, each node may comprise or coupled to an agent 313, 333. The agent may be in communication with the management controller 320. The agent can be the same as the agent as described in FIG. 1A or elsewhere herein.

Each of the nodes may be associated with one or more endpoints. In some embodiments, an endpoint may be associated with a security attribute. Endpoints share the same security attribute may be defined as a microsegment. In some cases, endpoints share the same security attribute may be defined as an endpoint group or security group (SG).

Endpoints associated with the same node may or may not share the same security attribute. For example, endpoint 311 may have security attribute as SG1 and endpoint 312 may have security attribute as SG2. Endpoints associated with different nodes may or may not share the same security attribute. For example, endpoint 312 associated with node 310 may share the attribute (e.g., SG2) of the endpoint 331 that is associated with a different node 330.

In some embodiments, an endpoint may be mapped to security attribute by one or more other attributes of the endpoint. In some cases, the one or more other attributes may be attributes of a packet transmitted between endpoints. A packet attribute can be a description of a certain characteristic that can be matched with a communication (e.g., a subnet or port range). For instance, source and destination packet attributes may include a MAC address, IP address, endpoint ID, user, process (e.g., name, PID), subnet, geographical location and the like, or any combination of the above.

In some embodiments, the mapping relationship may be stored in a database such as the endpoint database 315, 335. For example, endpoint 311 may be a virtual machine (e.g., VM1) with IP address of IP1 and the security attribute of endpoint 311 is identified as SG1 according to the mapping relationship stored in the endpoint DB 315. In some cases, the endpoint database may be a local database to the node. The endpoint database local to each node may not be synchronized across the nodes. For instance, endpoint databases associated with different nodes may contain local data that may not be the same across the nodes. For example, endpoint database 315 may comprise mapping information related to endpoints 311, 312 (e.g., VM1, VM2) and endpoint database 335 may comprise mapping information related to endpoints 331, 332 (e.g., VM3, VM4).

In some embodiments, the endpoint database 315, 335 may further store certificates issued to each endpoint. The certificate may be issued by a certificate authority operating on the management controller 320. For example, the certificate may be TLS certificate (e.g., Cerf1) associated with each workload or endpoint (e.g., VM1). Details regarding the certificates are described later herein.

Figure 4:
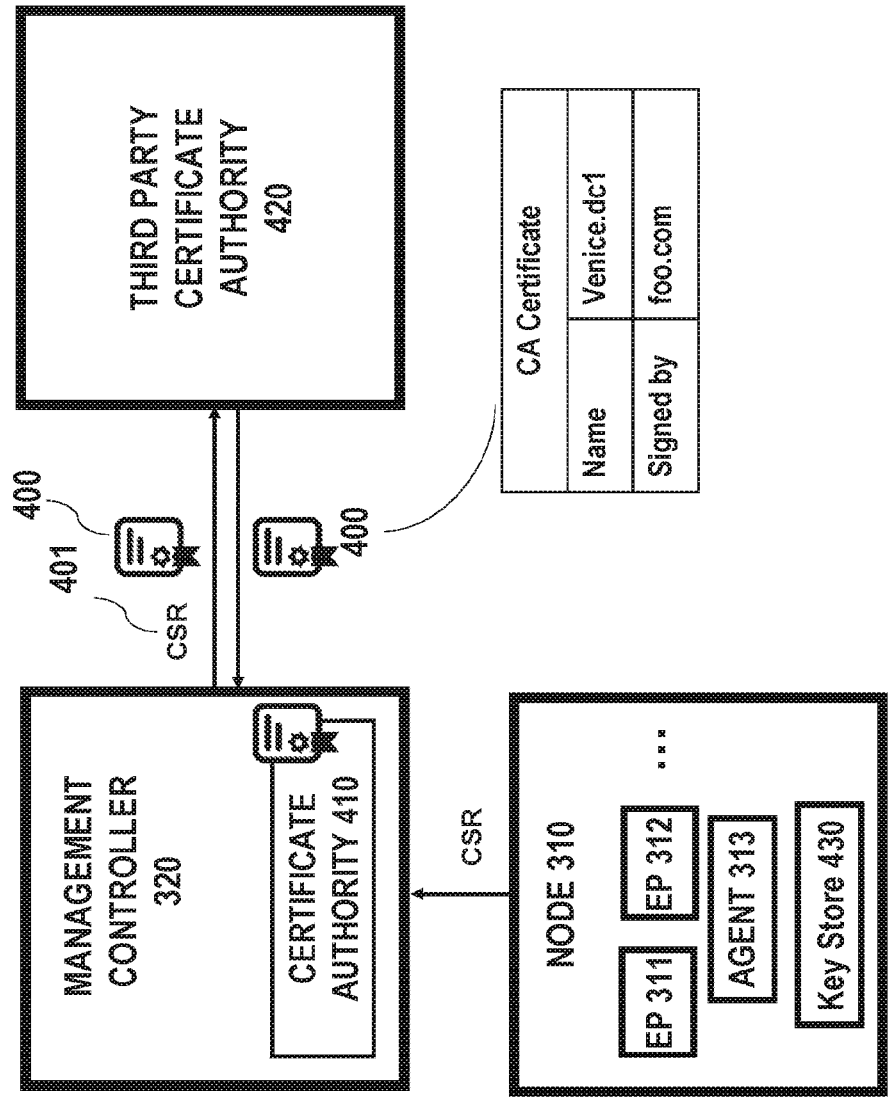
FIG. 4 shows a block diagram for setting up a certificate authority.

As mentioned above, a certificate authority may be verified by another certificate authority such as root certificate authority prior to setting up a connection. FIG. 4 shows a block diagram for setting up a certificate authority 320. As shown in the example, a certificate authority 410 may be provided by a management controller 320. The certificate authority 410 may be configured for issuing certificate for endpoints. In an example, Secure Sockets Layer (SSL) which is a well-known cryptographic protocol may be used to secure communications over networks such as the Internet. Cryptographic protocols such as SSL are often based on public key cryptographic systems, such as the RSA (Rivest, Shamir and Adelman) encryption algorithm. For a traditional RSA-based SSL session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the SSL server's publicly available RSA key. This generates an encrypted pre-master secret (ePMS), which is then provided to the SSLserver. The SSL server has a private decryption key, which is then used to decrypt the encrypted pre-master secret. At this point, both the client and the server have the original pre-master secret and can use it to generate the symmetric key used for actual encrypted and secure data exchange.

In some cases, a management controller or certificate authority may have a CA certificate and keypair used for communication with nodes or endpoints. When a new management controller 320 or certificate authority 410 is provisioned, the certificate authority 410 may generate a CA certificate and CSR (Certificate Signing Request) 401 and send the latter to a third party CA 420. The third party CA 420 may be a trusted CA such as a root CA, a CA a level higher in the certificate chain than the CA 410, or any other CA that may be further certified by another CA in some cases, the CSR 401 preferably may contain a pair of identifiers, such as a unique serial number for the management controller or the CA 410, as well as a serial number for the CSR version. The third party CA 420 may sign the CSR and send the certificate 400 to the CA 410. In some cases, the third party CA 420 may send a message containing the certificate details (serial number pair) to other intermediate CA that may communicate with the CA 410.

The CA certificate 400 signed by the third party certificate authority may comprise information related to the CA that signed the certificate (e.g., signed by foo.com) and the certified entity (e.g., intermediate CA 410 with name Venice.dc1). In the case when SSL is used, the certificate may comply with the X.509 standard. For example, the name of the intermediate CA may be a Distinguished Name (DN) uniquely identifies a CA in the X.509 certificate.

In some embodiments, an end of a connection such as a node may comprise a key repository such as a key store 430 for storing private keys of the certificate authority 410. The private key may be obtained from the CA 410 corresponding to the CA certificate. In some cases, the key repository may also contain one or more certificates (e.g., TLS/SSL certificate) issued for each workload or endpoint, one or more private keys associated with the TLS/SSL certificate, or certificates request that to be signed by the intermediate CA. In some cases when mutual authentication is required, the key repository may further store certificates issued to another endpoint or workload. In some instances, the key repository may also comprise the endpoint database such as endpoint database 315, 335 as described in FIG. 3. Alternatively, the endpoint database may be stored in a separate location from the key repository. The key repository may or may not store the policy table that has been described elsewhere herein.

The key repository may reside on a memory unit. The memory unit may be local to the node 310. The memory unit may be coupled to the agent 313 or accessed by the agent 313. In some cases, the memory unit may be a component of a network interface infrastructure such as NIC of the node 310. In some embodiments, the NIC may comprise a write port or communication interface allowing for memory read/write operations. For instance, the communication interface may support packets written to or read from the memory unit such as an external memory (e.g., high bandwidth memory (HBM) of a host device) or an internal static random access memory (SRAM). The communication interface may employ any suitable protocol such as Advanced Microcontroller Bus Architecture (AMBA) Advanced extensible Interface (AXI) protocol. AXI is a bus protocol for a high-speed/high-end on-chip bus protocol and has channels associated with read, write, address, and write response, which are respectively separated, individually operated, and have transaction properties such as multiple-outstanding address or write data interleaving. The AXI interface may include features that support for unaligned data transfers using byte strobes, burst based transactions with only start address issued, separate address/control and data phases, issuing of multiple outstanding addresses with out of order responses, and easy addition of register stages to provide timing closure. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

Figure 5:
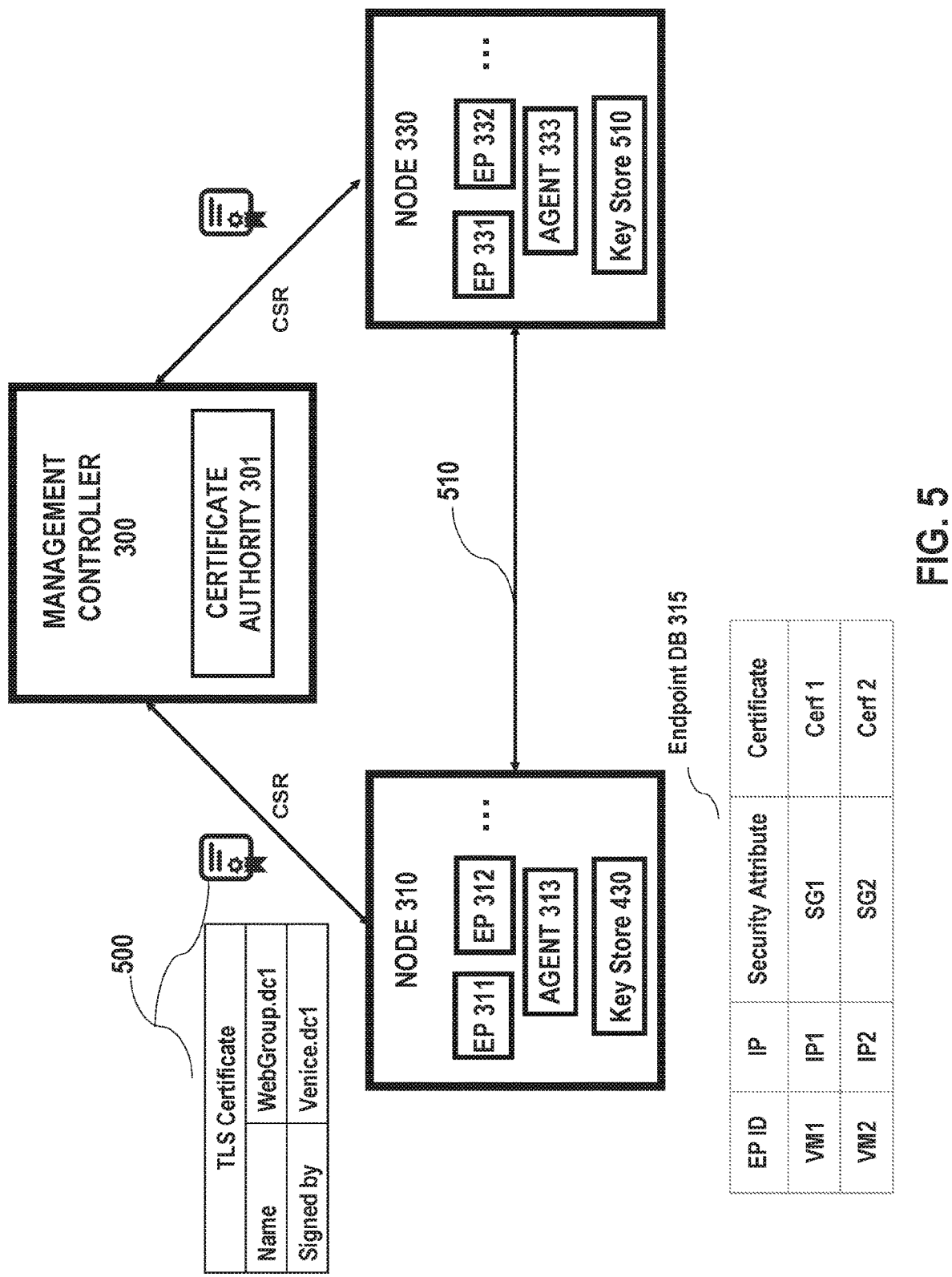
FIG. 5 depicts an exemplary network environment according to some embodiments.

FIG. 5 depicts an exemplary network environment according to some embodiments. A secure or authenticated connection may be provided by a system. The system may comprise at least a management controller operating a certificate authority and an agent associated with an end of a connection. In some cases, endpoints may be the source and destination of a connection 510. The connection 510 between a source and destination endpoints may be secured and authenticated utilizing certificates associated with each workload or the endpoints. Source node and destination node can be endpoints. For example, source node 310 may communicate (i.e., initiate a flow) with destination node 330 by sending data (e.g., packets) through a network (not shown). Alternatively, the connection 510 may be between an endpoint (e.g., EP 311, EP 312) supported by a source node and an endpoint (e.g., EP 331, EP 332) supported by the destination node 330. In some embodiments, each node of the network may comprise a key repository. The key repository associated with each node may comprise local data as described above. For instance, the key store 430 associated with node 310 may store certificates issued to endpoints 311, 312 and security attributes thereof, whereas the key store 510 associated with node 330 may store certificates issued to endpoints 331, 332 and security attributes thereof.

The certificate 500 associated with an endpoint may be issued by the certificate authority 301. The certificate 500 may be an endpoint certificate or workload certificate that identifies the endpoint and/or the CA that signs the certificate. In the illustrated example, the certificate issued to endpoint 311 may be a TLS/SSL certificate that comprises security attribute of the endpoint 311 and the CA that signs the certificate (e.g., CA with name Venice.dc1).

In some embodiments, the security attribute of an endpoint may be included in the certificate 500. The security attribute may be embedded in any field of the certificate. For example, as part of the X.509 certificate standard, the security attribute may be included in the Subject Alternative Name (SAN) field of the certificate. As shown in the example, the security attribute may be the security group (e.g., security group with name or identifier WebGroup.dc1) that endpoint 311 belongs to and is included in the certificate as SAN extension.

An endpoint may be created by obtaining a certificate issued to the endpoint. The endpoint certificate may be signed or issued by the certificate authority in response to receiving a CSR from the agent. For example, agent 313 may generate and send a CSR to the certificate authority 301 for creating endpoint 311. The CSR may comprise security attribute (e.g., security group) and other packet attributes such as IP address uniquely associated with the endpoint. The certificate authority 301 may sign the certificate and send it to the agent 313. The agent 313 may then manage and store the certificate associated with the endpoint 311 in a local database such as the endpoint database 315. The certificate associated with a workload or network flow may be identified by the packet attribute (e.g., endpoint ID, IP) as described elsewhere herein. For instance, a packet with source IP address (e.g., IP1) may be identified to be issued certificate Cerf1 having security attribute SG1 in the SAN field of the certificate.

For establishing a connection, the agent at the source endpoint side may be configured to inspect the packet attributes in a packet in order to identify the certificate associated with the endpoint. For example, agent 313 may see the IP address of the source endpoint 311 (e.g., IP1) then retrieve the Cerf1 from the endpoint database 315. Next the agent may initiate a connection with the certificate (e.g., Cerf1). For example, the agent 313 may continue with a SSL handshake with the destination endpoint (e.g., EP 331) using Cerf1 that has the security attribute (e.g., SG1) of the source endpoint in the SAN field.

In some cases, the agent at the destination endpoint may check the certificate and determine the security attributes of the source endpoint and security attributes of the destination endpoint. In some cases, the agent at the destination endpoint may determine the security attribute of the source endpoint by extracting the information from the certificate. The agent at the destination endpoint may determine the security attributes of the destination endpoint by mapping the destination IP to the security attributes based on the endpoint database local to the destination. For example, agent 333 may receive the certificate then examine the certificate (e.g., Cerf1) transmitted from the agent 313, and extract SG1 that is associated with the source endpoint 311 from the SAN field of Cerf1. The agent 333 may also determine the security group associated with the destination endpoint as specified by the packet (e.g., destination IP) based on a mapping relationship stored in the local endpoint database coupled to the agent 333.

In some cases, the agent at the destination side may also check policy database to determine an action according to the security attributes of the source and the destination endpoints. In some cases, the agent at the destination side may retrieve a certificate issued to the destination endpoint then transmitted the certificate to the agent at the source side for mutual authentication.

Figure 6:
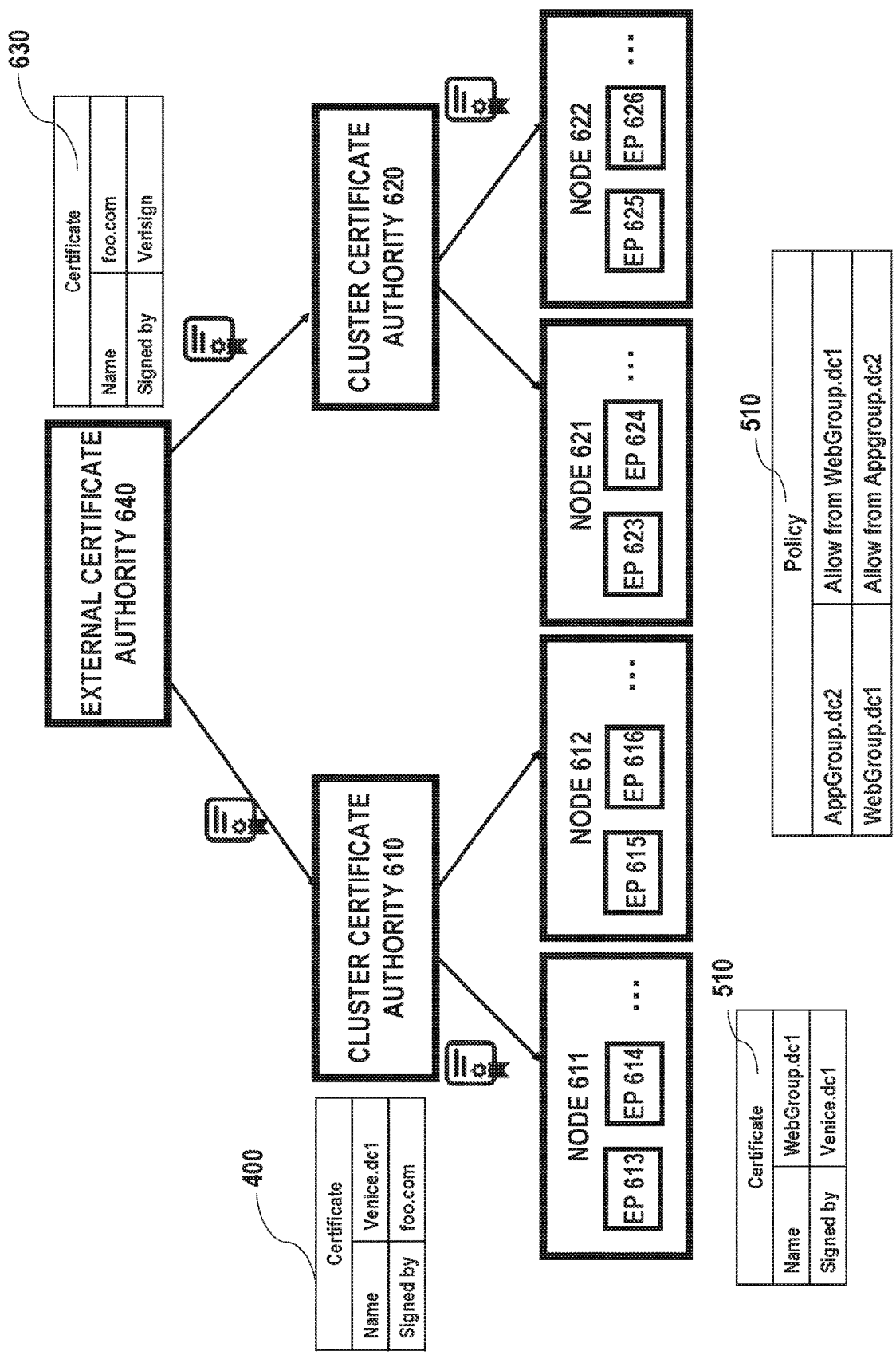
FIG. 6 shows an example of using multiple intermediate CAs in a system for establishing secure connections between endpoints.

In some cases, the source endpoint certificate and destination endpoint certificate may be signed by different CAs. Different CAs may be intermediate CAs certified by a third party CA such as a root CA. FIG. 6 shows an example of using multiple intermediate CAs 610, 620 in a system for establishing secure connections between endpoints.

In the illustrated example, multiple intermediate CAs such as cluster certificate authority 610 and cluster certificate 620 may obtain CA certificate respectively signed by an external certificate authority 640. The external CA may be a third party CA as described elsewhere herein. The third party CA may have a certificate 630 signed by a trusted CA such as itself if it is the root CA or another trusted CA.

An intermediate CA may be signed by the external certificate authority. An intermediate CA may be issued a certificate (e.g., certificate 400) by the external certificate authority 640. An intermediate CA may be configured to manage network security of a subnet. For example, cluster certificate authority 610 (i.e., intermediate CA) may be configured to sign certificates for nodes 611, 612 and associated endpoints 613, 614, 615, 616, cluster certificate authority 620 may be configured to sign certificates for nodes 621, 622 and associated endpoints 623, 624, 625, 626.

The intermediate CA may then work in conjunction with an agent at a node to issue a certificate for a workload or endpoint (e.g., certificate 510). A connection between endpoints may then be allowed or denied based on a policy (e.g., policy 510) determined by security attributes of the endpoints as described elsewhere herein.

Figure 7:
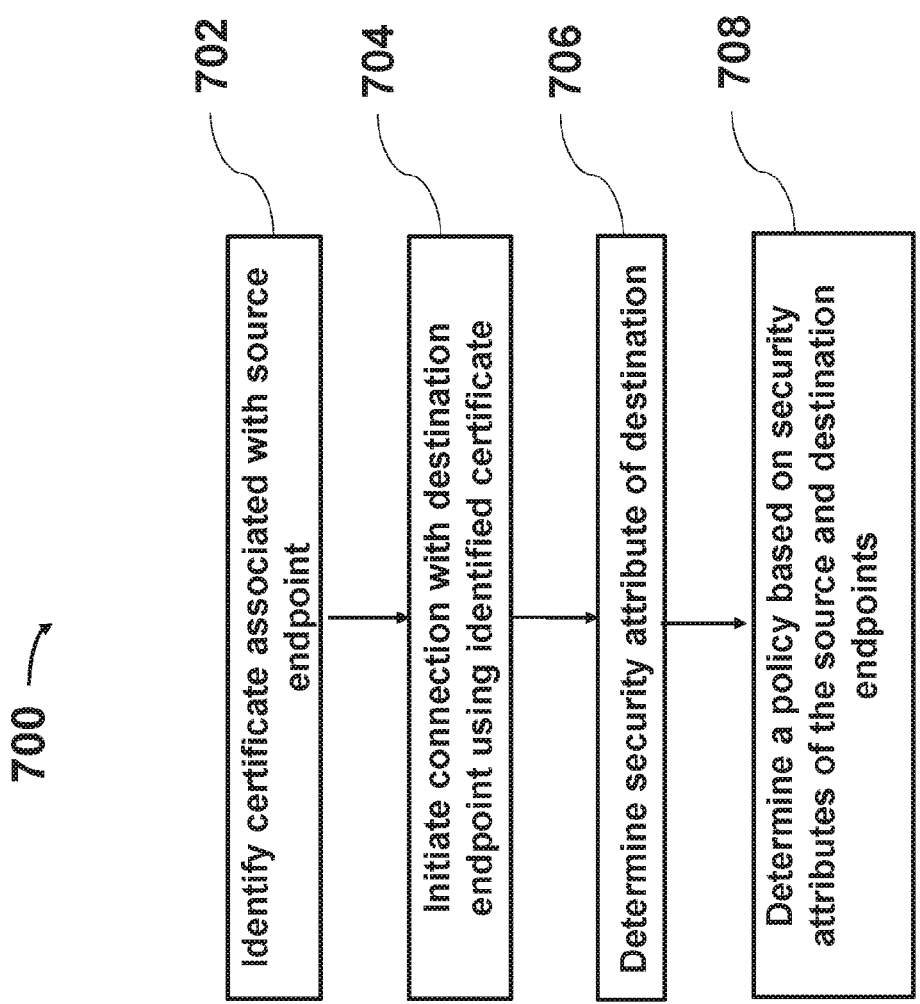
FIG. 7 shows an exemplary process for establishing a secure and/or authenticated connection, in accordance with embodiments of the invention.

FIG. 7 shows an exemplary process 700 for creating a secure and authenticated connection, in accordance with embodiments of the invention. The process 700 may begin by receiving a packet traversing a network (not shown). An agent at the source node or source endpoint may extract information related to the source endpoint and identify a certificate associated with the source endpoint 702. The information related to the source endpoint may be packet attribute related to the source endpoint such as IP address. The certificate may be determined by mapping the information related to the source endpoint to the certificate according to the mapping relationship stored in the endpoint database. The endpoint database may be a local database associated with the source node as described elsewhere herein.

Next, the source node may initiate a connection with the identified certificate 704. For example, the agent at the source node may initiate a handshake phase with the destination node or destination endpoint with the certificate issued to the source endpoint. In response to receiving the handshake request and the source endpoint certificate, the agent at the destination node may determine the security attribute associated with the destination endpoint 706. In some embodiments, the security attribute of the destination endpoint may be determined using the mapping relationship stored in the endpoint database at the destination node. The agent at the destination node may further extract the security attribute contained in the certificate sent from the source node. Then the agent at the destination node may look up a policy database and determine a policy or action based on the security attributes of the source and destination endpoints 708.

Figure 8:
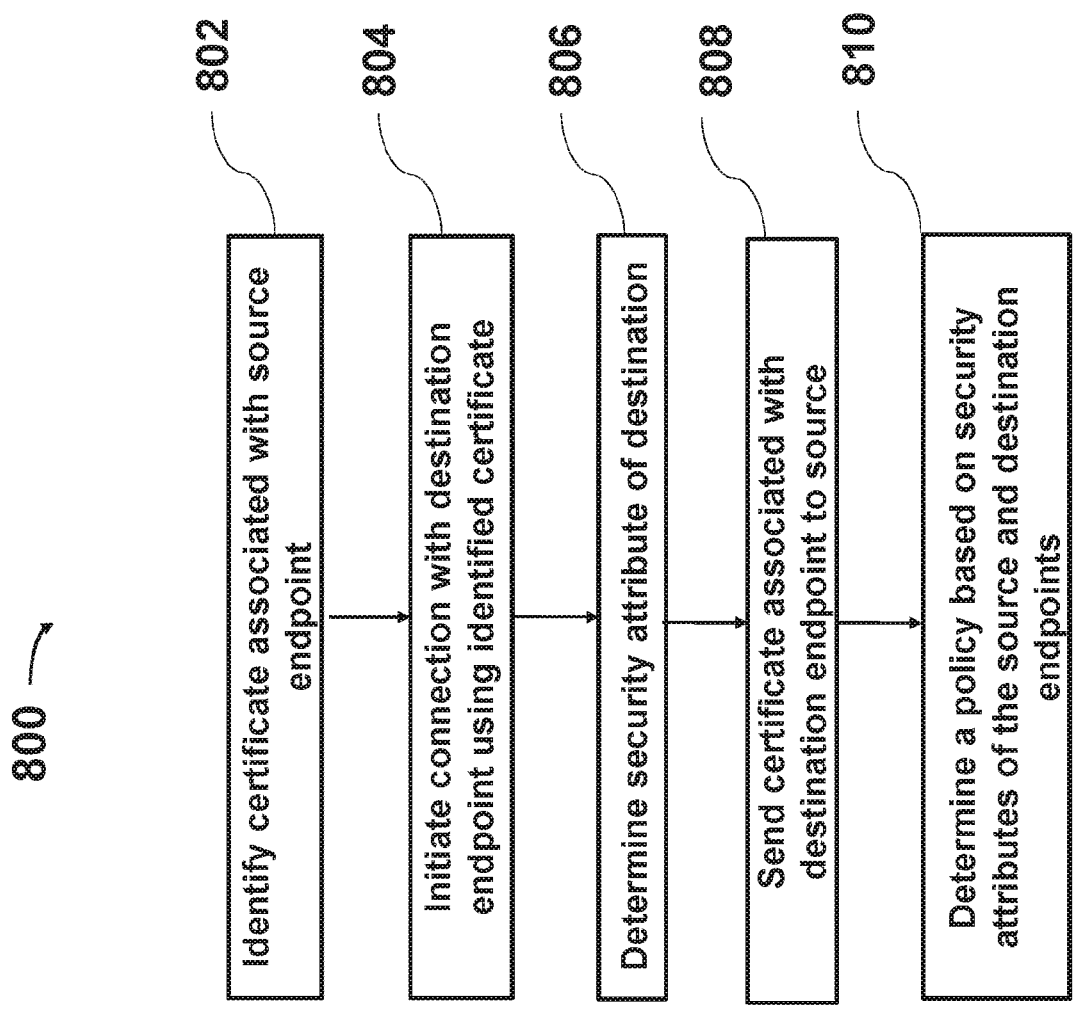
FIG. 8 illustrates an exemplary process performed by the system for mutual authentication between endpoints of a connection.

Although FIG. 7 shows a method in accordance with some embodiments a person of ordinary skill in the art will recognize that there are many adaptations for various embodiments. For example, the operations can be performed in any order. Some of the operations may be precluded, some of the operations may be performed concurrently in one step, some of the operations repeated, and some of the operations may comprise sub-steps of other operations. The method may also be modified in accordance with other aspects of the disclosure as provided herein FIG. 8 illustrates another process 800 performed by the system for mutual authentication between endpoints of a connection. Similar to the aforementioned process, the mutual authentication process 800 may begin by receiving a packet traversing a network (not shown). An agent at the source node or source endpoint may extract information related to the source endpoint and identify a certificate associated with the source endpoint 802. The information related to the source endpoint may be packet attribute related to the source endpoint such as IP address. The certificate may be determined by mapping the information related to the source endpoint to the certificate based on the endpoint database. The endpoint database may be a local database associated with the source node.

Next, the source node may initiate a connection with the identified certificate 804. For example, the agent at the source node may initiate a handshake phase with the destination node or destination endpoint using the certificate issued to the source endpoint. In response to receiving the handshake request and the source endpoint certificate, the agent at the destination node may determine the security attribute associated with the destination endpoint 806. In some embodiments, the security attribute of the destination endpoint may be determined using the mapping relationship stored in the endpoint database at the destination node. In some cases, the agent at the destination node may further extract the security attribute contained in the certificate sent from the source node to verify the authenticity of the source endpoint. Next, the agent at the destination node may identify a certificate issued to the destination endpoint and send it back to the source node 808. Upon receiving the destination endpoint certificate, the agent at the source node may extract the security attribute of the destination endpoint from the certificate. Then the agent at the source node may look up a policy database and determine a policy or action based on the security attributes of the source and destination endpoints 810.

The agent can have one or more processors and at least one memory for storing program instructions. The processors can be part of the network interface system or device. Alternatively or additionally, the processors can be part of the host system. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the agent can be implemented in hardware components (e.g., ASICs, special purpose computers, or general purpose computers), software or combinations of hardware and software.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

The instructions, media for conveying such instructions, computing resources for executing them, and other structures for supporting such computing resources are means for providing the functions described in these disclosures.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for establishing a secure and authenticated network connection, the method comprising:
    a) receiving, from a requesting entity, a destination IP address and a first certificate that is used to establish a secure network connection, wherein the first certificate comprises a first security attribute associated with a source IP address, wherein the first certificate is a trusted certificate issued by a certificate authority, wherein the first security attribute in the first certificate comprises a security group associated with the source IP address, the security group including multiple endpoints identified to share a security attribute;
    b) identifying, with aid of one or more processors, a stored second security attribute associated with the destination IP address; and
    c) determining, with aid of the one or more processors, a policy action based at least in part on the first security attribute and the second security attribute.

2. The method of claim 1, wherein the certificate authority comprises an intermediate certificate authority, the method further comprising transmitting, from the requesting entity, a certificate signing request (CSR) to the intermediate certificate authority, wherein the CSR comprises the first security attribute and the associated source IP address.

3. The method of claim 2, wherein a mapping relationship between the first security attribute and the source IP address is received from a computing device running the intermediate certificate authority.

4. The method of claim 3, wherein the mapping relationship is at least in part managed by the intermediate certificate authority.

5. The method of claim 2, further comprising receiving a certificate from the intermediate certificate authority, wherein the certificate comprises the first security attribute.

6. The method of claim 2, further comprising storing the certificate in a local database managed by the requesting entity.

7. The method of claim 2, wherein the intermediate certificate authority is verified by a root certificate authority.

8. The method of claim 1, further comprising identifying, with aid of the one or more processors, a second certificate associated with the destination IP address.

9. The method of claim 8, further comprising transmitting the second certificate to the requesting entity.

10. The method of claim 8, wherein the first certificate and the second certificate are issued by the certificate authority.

11. The method of claim 8, wherein the certificate authority comprises a first intermediate certificate authority, wherein the second certificate is issued by a second intermediate certificate authority, the first intermediate certificate authority being different than the second intermediate certificate authority.

12. The method of claim 11, wherein the first intermediate certificate authority and the second intermediate certificate authority are verified by the same root certificate authority.

13. The method of claim 1, further comprising executing the policy action on a base system logic or by the requesting entity.

14. The method of claim 13, wherein the base system logic comprises a bare metal server, a hypervisor or a docker base for controlling one or more virtual machines or containers.

15. The method of claim 1, wherein the policy action comprises at least one of the following: allow, block, rate-limit, mark and alert.

16. The method of claim 1, wherein the security group is mapped to the source IP address in a database.

17. The method of claim 1, wherein the second security attribute comprises a security group the destination IP address is associated therewith.

18. A network interface device comprising: a memory for storing a set of instructions and one or more processors configured to execute the set of instructions to perform at least the following:
   a) receive, from a requesting entity, a destination IP address and a first certificate that is used to establish a secure network connection, wherein the first certificate comprises a first security attribute associated with a source IP address, wherein the first certificate is a trusted certificate issued by a certificate authority, and wherein the first security attribute in the first certificate comprises a security group associated with the source IP address, the security group including multiple endpoints identified to share a security attribute;
   b) identify a stored second security attribute associated with the destination IP address; and
   c) determine a policy action based at least in part on the first security attribute and the second security attribute.

19. The network interface device of claim 18, wherein the certificate authority comprises an intermediate certificate authority, wherein the one or more processors are further configured to generate and transmit a certificate signing request (CSR) to the intermediate certificate authority, and wherein the CSR comprises the first security attribute and the associated source IP address.

20. The network interface device of claim 19, wherein a mapping relationship between the first security attribute and the source IP address is received from a computing device running the intermediate certificate authority.

21. The network interface device of claim 20, wherein mapping relationship is at least in part managed by the intermediate certificate authority.

22. The network interface device of claim 19, wherein the one or more processors are further configured to receive a signed certificate from the intermediate certificate authority, and wherein the signed certificate comprises the first security attribute.

23. The network interface device of claim 22, wherein the one or more processors are further configured to store the signed certificate in a local database managed by the network interface device.

24. The network interface device of claim 19, wherein the intermediate certificate authority is verified by a root certificate authority.

25. The network interface device of claim 18, wherein the one or more processors further configured to identity a second certificate associated with the destination IP address.

26. The network interface device of claim 25, wherein the one or more processors further configured to transmit the second certificate to the requesting entity.

27. The network interface device of claim 25, wherein the first certificate and the second certificate are issued by the certificate authority.

28. The network interface device of claim 25, wherein the certificate authority comprises a first intermediate certificate authority, wherein the second certificate is issued by a second intermediate certificate authority, the first intermediate certificate authority being different than the second intermediate certificate authority.

29. The network interface device of claim 28, wherein the first intermediate certificate authority and the second intermediate certificate authority are verified by the same root certificate authority.

30. The network interface device of claim 18, wherein the policy action is executed on a base system logic.

31. The network interface device of claim 30, wherein the base system logic comprises a bare metal server, a hypervisor or a docker base for controlling one or more virtual machines or containers and wherein the bare metal server, the hypervisor or the docker base is coupled to the network interface device.

32. The network interface device of claim 18, wherein the policy action is selected from the group consisting of: allow, block, rate-limit, mark and alert.

33. The network interface device of claim 18, wherein the second security attribute comprises a security group the destination IP address is associated therewith.

* * * * *